July 20, 1926.

H. M. WOLGAMOOD

FLOOR SANDING MACHINE

Filed Sept. 11, 1925

Inventor

Hugh M. Wolgamood.

By A. O'Brien

Attorney

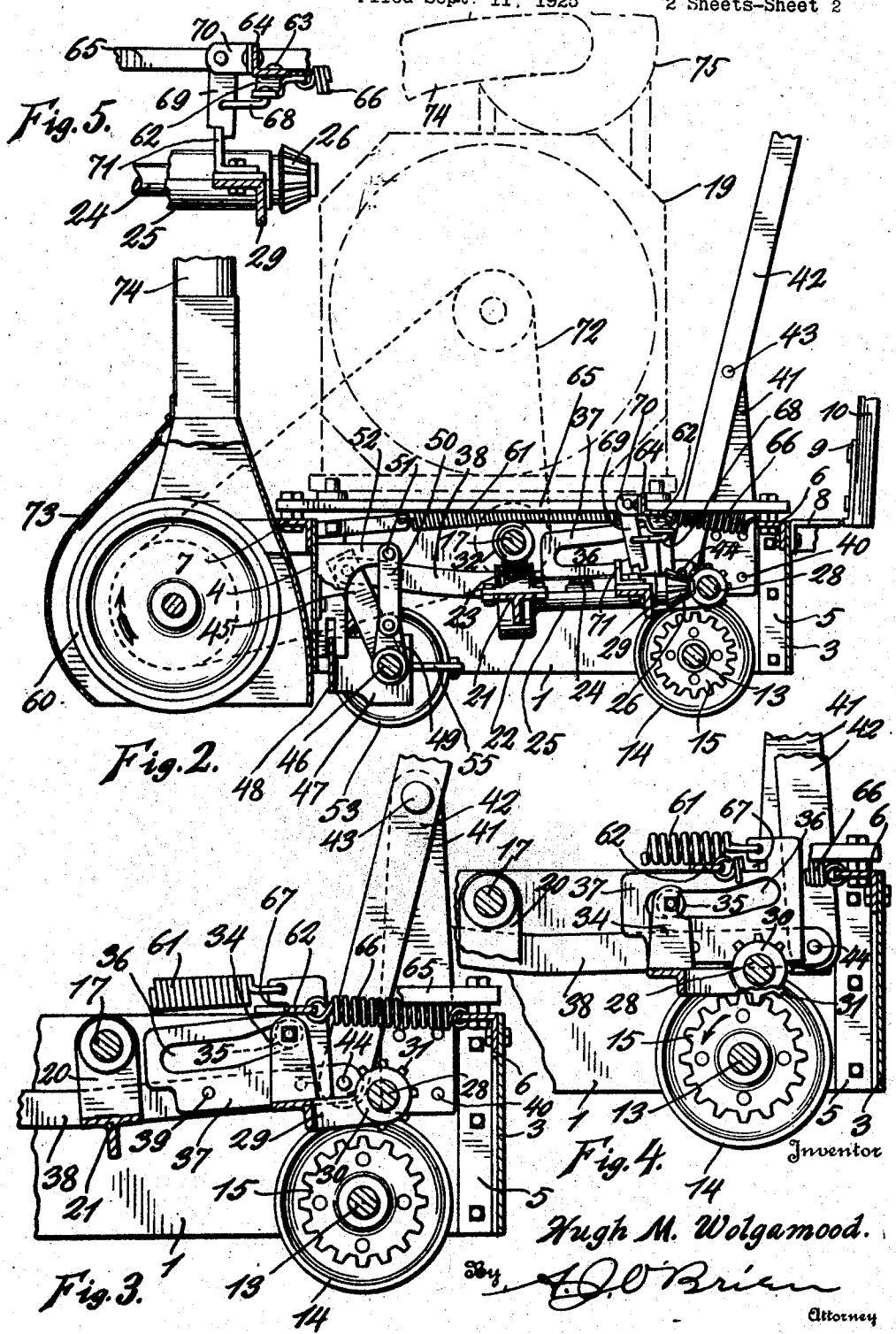

Patented July 20, 1926.

1,593,152

UNITED STATES PATENT OFFICE

HUGH M. WOLGAMOOD, OF DENVER, COLORADO.

FLOOR-SANDING MACHINE.

Application filed September 11, 1925. Serial No. 55,695.

This invention relates to improvements in floor sanding machines.

It is the object of this invention to produce a sanding machine that shall be self-propelling, dust proof and provided with means for guiding the machine when it is transported on its own trucks. It is a further object to produce a machine that shall be easy to operate and which does not require the operator to exert any force for the purpose of producing the required pressure between the roller and the floor.

The above and other objects that will become apparent as the description proceeds are attained by means of a construction that I will now proceed to describe in detail, reference for this purpose being had to the accompanying drawings in which the invention has been illustrated and in which:

Fig. 2 is a section taken on lines 2—2 Fig. 1;

Fig. 3 is a section taken on line 3—3 Fig. 1;

Fig. 4 is a section taken on line 4—4 Fig. 1, and

Fig. 5 is a section taken on line 5—5 Fig. 1.

Figure 1:
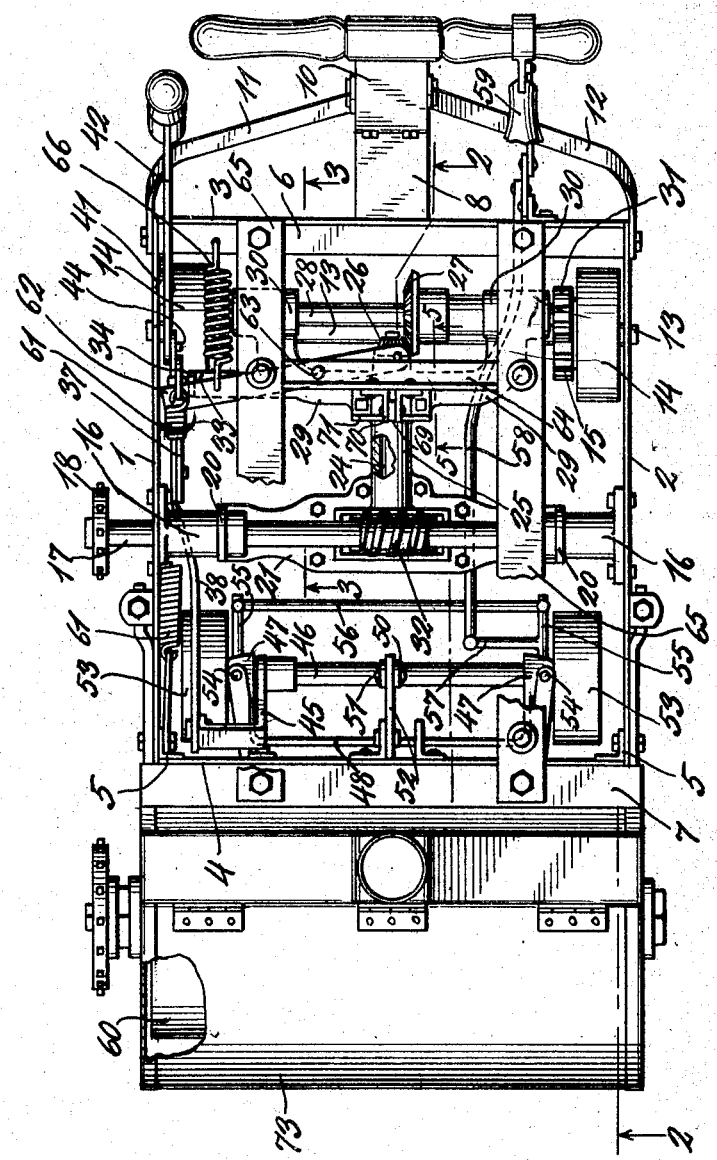
Fig. 1 is a plan view of my machine, the motor and fan having been removed for the sake of clearness.

The machine has a rectangular frame consisting of two sides 1, 2 and two end pieces 3, 4 connected at the corners by angles 5. Extending along the upper edge of end member 3 is an angle 6 and a similar angle 7 is secured to the front side of the end member 4. A bracket 8 is connected to the rear side of the end member 3 and has its free end 9 turned upwardly so as to form an attaching means for the handle 10 which is further secured to the frame by braces 11 and 12. Pivotally mounted in the sides 1 and 2 near their rear ends is a shaft 13 carrying wheels 14. Secured to the shaft 13 at a point intermediate the wheels 14 or to the wheels themselves, as shown, are gears 15. Secured to the inner surfaces of sides 1 and 2 are bearings 16 in which the shaft 17 is journaled. This shaft carries at its outer end a sprocket wheel 18 that receives power from a suitable motor 19 (shown dotted in Fig. 2). Supported from the shaft 17 by means of brackets 20 is a bar 21 having a central semicircular depression 22 for the reception of a worm gear 23 which is secured to one end of the shaft 24 which is journaled in the bearing 25 and carries at its other end a bevel pinion 26 which meshes with a gear 27 secured to the shaft 28. It will be seen from Fig. 1 that the rear end of bearing 25 branches and forms two arms each of which has a bearing 30 within which the shaft 28 rotates. To the ends of the shaft 28 I have secured spur pinions 31 which are adapted to be moved into and out of mesh with gears 15 (Figs. 3 and 4). By referring back to Fig. 1 it will be seen that shaft 17 carries a worm 32 which engages the worm wheel 23 so that when shaft 17 is turned shaft 28 will be rotated, and if the gears 31 and 15 are in mesh in the manner shown in Fig. 4, the wheels 14 will be rotated. For the purpose of moving gears 15 and 31 into and out of mesh I have provided the mechanism which will now be described. The brackets 20 are pivotally attached to the shaft 17 so that the bar 21, arms 29 and shaft 28 are movable about the axis of shaft 17. I have provided an extension 33 on the right hand arm 29 and projecting upwardly from this extension is a bracket 34. Secured to the bracket 34 is a roller 35 which extends into the cam slot 36 of member 37 which is formed from a flat piece secured to the flat bar 38 by means of rivets 39. Attention is called to the fact that the rear end of slot 36 is upwardly inclined (Figs. 3 and 4). Secured to side 1 by means of rivets 40 is a bracket 41 to which the handle or lever 42 is pivotally secured at 43. The lower end of lever 42 is attached to the rear end of the bar 38 by means of a bolt or rivet 44. It is now evident that the bar 38 can be moved backwards or forwards by means of the lever 42. The forward end of bar 38 is pivoted to the upper end of lever 45 whose lower end is nonrotatably connected with the shaft 46 which in its turn is rotatably mounted in the parallel end members 47 of the flat bar 48. A second and shorter lever 49 is nonrotatably connected with the shaft 46 and has its upper end pivoted to the lower end of the link 50 whose upper end is pivoted at 51 to the outer end of the bracket 52 which is secured to the rear surface of the end member 4. Lever 49 and link 50 form a toggle by means of which the shaft 46 may be raised and lowered with respect to the frame. The front wheels 53 are secured to spindles resembling those employed in connection with the front wheels of automobiles. These spindles are rotatable about the axes of the spindle bolts 54 and have spindle arms 55 whose ends are connected by means of a rod 56. One of the spindle arms has an arm 57 extending inwardly. This arm is connected to the forward end of a drag link 58 that can be moved forward and backward by means of a mechanism comprising a handle 59 but which has not been shown in detail as its specific form is not essential to a full understanding of the invention claimed. It is apparent, however, that by moving the drag link 58 forward or backward the wheels 53 can be rotated about the spindle bolts 54 which permits the machine to be guided while it is being transported. When the handle 42 is in the position shown in Figs. 2 and 3, the whole weight of the machine rests upon the wheels 14 and 53 and the sanding roller 60 is held out of contact with the surface of the floor. When the parts are in this position the machine can be moved by pressure exerted on handle 42 and guided by means of the handle 59. If the handle 42 is moved forwardly, it will move the bar 38 rearwardly and when this occurs the following changes take place. The lever 45 is rotated clockwise (Fig. 2) thereby imparting a clockwise rotation to the shaft 46. This rotates the lever 49 and breaks the toggle formed by this lever and the link 50 thereby permitting the frame to move downwardly until the sanding roller rests upon the floor. When the bar 38 moves rearwardly against the tension of the spring 61, it carries with it the member 37 which is moved from the position shown in Figs. 2 and 3 to that shown in Fig. 4 thereby causing the bracket 34 to be moved downwardly until the pinions 31 engage with the gears 15 whereby the wheels 14 become connected to the drive shaft 17. The weight of the entire machine now rests upon the sanding roll 60 and wheels 14 except, perhaps, a small part that may still be borne by the front wheels. In Fig. 1 I have shown a lever 62 pivoted at 63 to the lower side of the angle 64 that is secured to and carried by the bars 65. A spring 66 has one end connected to the lever 62 and the other to the angle 6 and tends to hold the outer end of lever 62 against the edge of the rear end of the slot 67 in member 37. The other end of lever 62 has pivotally attached to it a link 68 whose other end is connected to the lever 69 whose upper end is pivoted between the angles 70. Secured to the upper side of arm 29 is an angle 71 whose upper edge lies in the path of the lever 69. When the lever 42 is moved ahead the spring 66 rotates lever 62 and thereby moves the lever 69 against the rear side of the angle 71 and when the latter is sufficiently depressed by the cam slot 36 the notch in the lower end of lever 69 will engage the upper edge of the vertical flange of angle 71 and provide a positive stop against upward movement, whereby the gears 15 and 31 are held against disengagement. When the motor 19 is running it transmits power to shaft 17 and to the sanding roll by means of a sprocket chain 72 thereby causing the sanding roll to rotate in the direction of the arrow and the machine to travel forwardly. The roll 60 is enclosed in a housing 73 whose upper end is connected by means of a conduit 74 with a fan 75 which removes the dust by suction in the manner now old and well known. When the machine has reached the end of the floor the lever 42 is moved rearwardly, this disconnects the gears 15 and 31 and at the same time raises the sanding roll so that the entire weight of the machine is now supported on the wheels which makes it possible to turn the machine and get it headed in the opposite direction. I desire to call particular attention to the fact that my machine is self-propelling and that it is propelled by means of power applied to the rear wheels. I also desire to call attention in particular to the mechanism by means of which the gears 15 and 31 are moved into and out of operative position and locked in such position.

Having now described my invention what I claim as new is:

1. In a floor sanding machine, in combination, a frame, a pair of spaced wheels secured to the frame, a gear wheel secured to one of said wheels, a shaft rotatably mounted on the frame and extending parallel with the axis of the wheels, a bearing pivotally connected to the shaft, a shaft rotatably mounted in the bearing, said last mentioned shaft having its axis perpendicular to the axis of the first shaft, means for transmitting power from the first shaft to the second shaft, two spaced arms projecting from the free end of said bearing, a third shaft rotatably mounted in the ends of said arms, said third shaft being parallel with the first mentioned shaft, means for transmitting power from the second shaft to the third shaft, a gear carried by the third shaft and means for moving said last named gear into and out of operative relation with the gear on the wheel.

2. In a floor sanding machine, in combination, a frame, a pair of spaced wheels secured to the frame, a gear wheel secured to one of said wheels, a shaft rotatably mounted on the frame and extending parallel with the axis of the wheels, a bearing pivotally connected to the shaft, a shaft rotatably mounted in the bearing, said last mentioned shaft having its axis perpendicular to the axis of the first shaft, means for transmitting power from the first shaft to the second shaft, two spaced arms projecting from the free end of said bearing, a third shaft rotatably mounted in the ends of said arms, said third shaft being parallel with the first mentioned shaft, means for transmitting power from the second shaft to the third shaft and means for moving said last named gear into and out of operative relation with the gear on the wheel, said last named means comprising a cam member.

3. In a floor sanding machine, in combination, a frame, a pair of spaced wheels secured to the frame, a gear wheel secured to one of said wheels, a shaft rotatably mounted on the frame and extending parallel with the axis of the wheels, a bearing pivotally connected to the shaft, a shaft rotatably mounted in the bearing, said last mentioned shaft having its axis perpendicular to the axis of the first shaft, means for transmitting power from the first shaft to the second shaft, two spaced arms projecting from the free end of said bearing, a third shaft rotatably mounted in the ends of said arms, said third shaft being parallel with the first mentioned shaft, means for transmitting power from the second shaft to the third shaft, a gear carried by the third shaft and means for moving said last named gear into and out of operative relation with the gear on the wheel, said last named means comprising a cam member and means comprising a lever for moving said cam.

4. In a floor sanding machine, in combination, a rectangular frame, a sanding roller rotatably attached to one end of said frame, a pair of propelling wheels rotatably connected to the other end of the frame, a pair of guiding wheels secured to the frame between the sanding roller and the first mentioned wheels, a toggle mechanism between the frame and the guiding wheels for producing relative vertical movement of the frame with respect to the guiding wheels, a source of power, means for transmitting power to the propelling wheels, said means comprising interconnecting gears and means for simultaneously lowering the frame with respect to the guiding wheels and for moving said gears into mesh, said means being also adapted to simultaneously raise the frame with respect to the guiding wheels and disconnecting the gears.

5. In a floor sanding machine, in combination, a rectangular frame, a sanding roller rotatably secured to one end of the frame, a pair of propelling wheels secured to the frame near the other end, a pair of guiding wheels secured to the frame between the propelling wheels and the sanding roller, means for raising and lowering the frame with respect to the guiding wheels so as to bring the sanding roller into and out of contact with the floor, a source of power carried by the frame, means for transmitting power to the roller and to the propelling wheels and means for simultaneously raising the roller and disconnecting the power from the propelling wheel and for lowering the roller and connecting the power to the propelling wheel.

6. In a floor sanding machine, in combination, a rectangular frame, a sanding roller rotatably secured to one end of the frame, a pair of propelling wheels secured to the frame near the other end, a pair of guiding wheels secured to the frame between the propelling wheels and the sanding roller, means for raising and lowering the frame with respect to the guiding wheels so as to bring the sanding roller into and out of contact with the floor, a source of power carried by the frame, means for transmitting power to the roller and to the propelling wheels and means for simultaneously raising the roller and disconnecting the power from the propelling wheel and for lowering the roller and connecting the power to the propelling wheel, said means comprising a lever operatively connected with a toggle mechanism which controls the elevation of the frame and with a cam that controls the power connection to the propelling wheels.

In testimony whereof I affix my signature.

HUGH M. WOLGAMOOD.